United States Patent [19]

Eckert et al.

[11] 4,302,821

[45] Nov. 24, 1981

[54] INTERPOSER CONTROL FOR ELECTRONIC POSTAGE METER

[75] Inventors: Alton B. Eckert, Norwalk; C. Edward Duwel, Trumbull; Arno Muller, Westport, all of Conn.

[73] Assignee: Pitney-Bowes, Inc., Stamford, Conn.

[21] Appl. No.: 89,411

[22] Filed: Oct. 30, 1979

[51] Int. Cl.³ .............................................. G06F 15/21

[52] U.S. Cl. .................................... 364/900; 364/464; 371/20

[58] Field of Search ........................... 371/9, 8, 16, 20; 364/200, 900, 464, 466

[56] References Cited

U.S. PATENT DOCUMENTS

| | | | |
|---|---|---|---|
| 2,934,009 | 4/1960 | Bach et al. | 101/235 |
| 3,786,433 | 1/1974 | Netley et al. | 364/200 |
| 3,978,457 | 8/1976 | Check, Jr. et al. | 364/200 |
| 4,032,757 | 6/1977 | Eccles | 364/101 |
| 4,050,374 | 9/1977 | Check, Jr. | 101/91 |
| 4,051,913 | 10/1977 | Gudea | 364/466 |
| 4,097,923 | 6/1978 | Eckert, Jr. et al. | 364/900 |
| 4,139,892 | 2/1979 | Gudea et al. | 364/466 |
| 4,179,747 | 12/1979 | Dlugos | 364/466 |
| 4,180,856 | 12/1979 | Check, Jr. et al. | 364/466 |
| 4,205,374 | 5/1980 | Bardsley et al. | 371/9 |

*Primary Examiner*—Charles E. Atkinson

*Attorney, Agent, or Firm*—David E. Pitchenik; William D. Soltow, Jr.; Albert W. Scribner

[57] ABSTRACT

An electronic postal meter, adapted to be driven by a meter base has a shutter for controlling the application of drive input to the meter, and a solenoid driven interposer for blocking operation of the shutter until conditions for printing postage are met. The solenoid is energized by way of a pair of serially connected transistors, which are in turn controlled by separate micro-processing systems. The separate micro-processing systems continually exchange messages concerning the operational status of the postal meter, whereby each of the controlling systems is responsive to conditions under which the postal meter should not be operative, to thereby control its respective transistor.

20 Claims, 9 Drawing Figures

FIG. 5
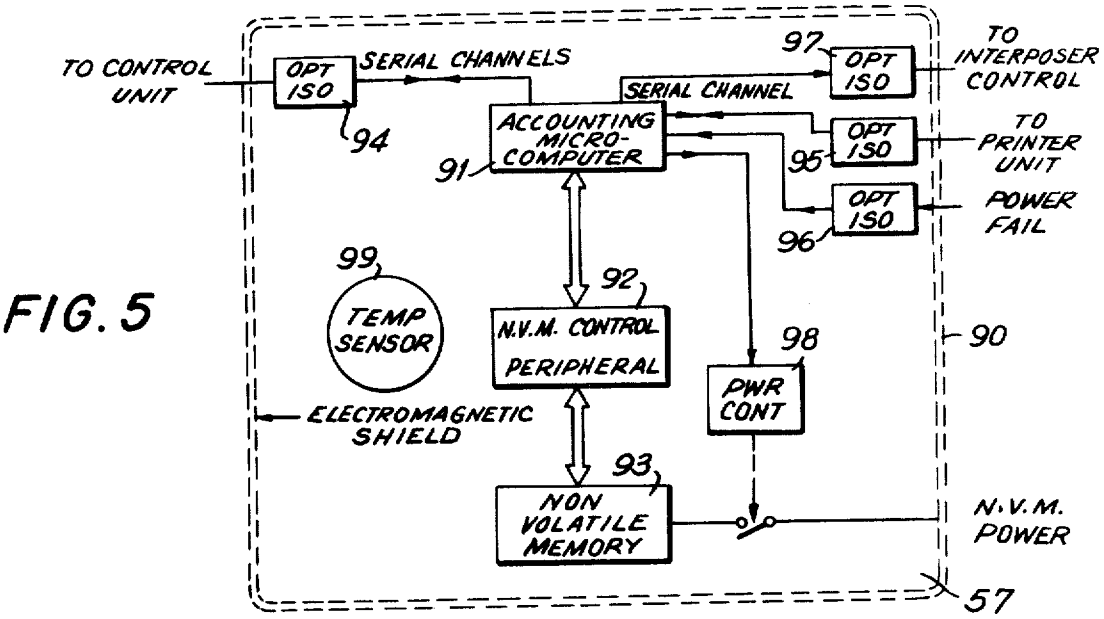
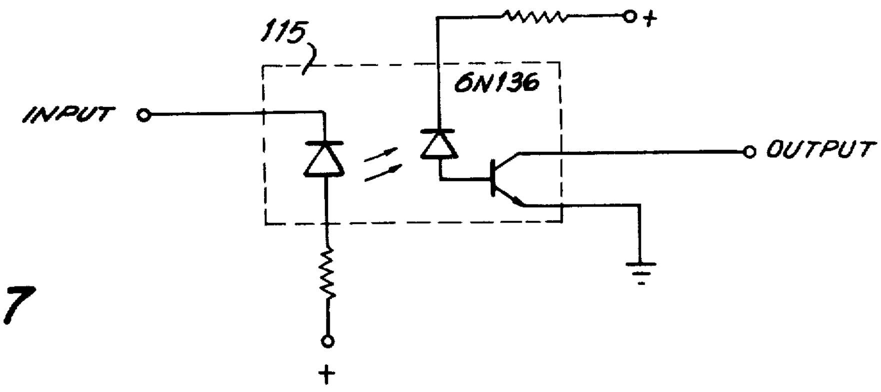
FIG. 7

INTERPOSER CONTROL FOR ELECTRONIC POSTAGE METER

This invention relates to electronic postage meters, and is more particularly related to an electronic postage meter of a type having a keyboard for the entry of postage to be printed, a display for displaying postage to be printed, as well as other data, an electronic accounting device, and a printing mechanism.

Inventions of the above type are generally known, and are discussed, for example, in U.S. Pat. No. 3,978,457.

This reference discloses a system for a postage meter including a keyboard for the manual introduction of data corresponding to the postage to be printed. It will be apparent from the following disclosure, however, that the present invention does not require a manual entry of data into a keyboard, since the system is equally adaptable to entry of data from other sources.

Co-pending U.S. patent application Ser. No. 024,812, filed Mar. 28, 1979, and assigned to the assignee of the present application, and also concurrently filed application Ser. No. 89,412, for a "Print Control System", in the name of A. Eckert, R. Malin, R. McFiggans and L. Pengue, and assigned to the assignee of the present application, disclosed systems wherein an electronic postage meter is adapted to to be driven by a postage meter base, of the type disclosed, for example, in U.S. Pat. No. 2,934,009, Bach et al.

In the latter type of electronic postage meter, the postage meter is provided with a shutter adapted to engage a drive gear, the drive gear being externally powered by the drive base, and in turn effecting the printing of postage. In these arrangements, an interposer, in the form of a lever, serves to control the operation of the shutter, thereby inhibiting initiation of postage cycles under certain conditions, indicative of faults or errors. The interposer in turn is driven by a solenoid.

Since the solenoid, or other output device serving the functions thereof, serves as a primary device, preventing the printing of postage until all functions within the meter are correct, it is essential that the solenoid or other output device be positively controlled in such a manner that simple errors or faults cannot defeat it.

Briefly stated then, the present invention is directed to a system for driving an interposer solenoid for a postal meter, or an output device that similarly acts to prevent operation of the postal meter, whereby misfunctioning and malfunctioning of the meter are minimized.

Briefly stated, in accordance with the invention this effect is achieved by the provision of first and second current controlling means, such as bi-polar transistors, the interposer solenoid or other output device being energized by way of the output current paths, such as the emitter-collector paths of the two transistors, in series. Thereby, each of the transistors must be rendered conductive in order for the solenoid or output device to be energized to in turn enable operation of the postage meter.

Further, in accordance with the present invention, the two transistors are controlled, for example, by way of their bases, from a pair of input systems. The input systems, which may be in the form of separate microprocessing systems, coordinate their activities by exchanging messages regarding the status of the different portions of the postal meter. As a consequence, when a fault or other condition occurs that renders it undesirable for the meter to print postage, and this condition is determined in one of the controlling systems, this controlling system renders or maintains its associated transistor nonconductive, and signals the other controlling system to likewise render or maintain its transistor nonconductive. It is thus apparent that faults in either of the transistors, as well as certain faults in the controlling systems will not result in the erroneous printing of postage.

In the particularly advantageous arrangement in accordance with the invention, the postal meter is comprised of an accounting system including a microprocessor, the accounting system having accounting registers and being connected to control one of the transistors. The system further has a printer system with a microprocessor coupled to control the other transistor. The two systems are in communication with each other with respect to control and operational conditions of the equipment.

In order that the invention will be more clearly understood, it will now be disclosed in greater detail with reference to the accompanying drawings, wherein:

FIG. 5 is a simplified diagram of a circuit for the accounting system of a postal meter in accordance with the invention;

FIG. 7 is a circuit diagram of an opto-electric isolator that may be employed in the present invention;

Figure 1:
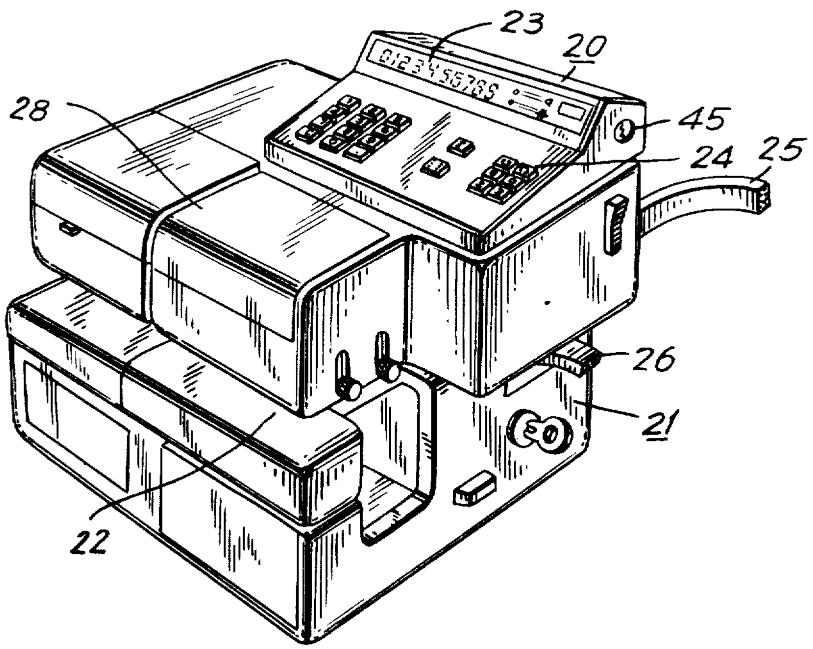
FIG. 1 is a simplified perspective view of a postal meter which may incorporate the system of the present invention.

Referring now to the drawings, and more in particular to FIG. 1, therein is illustrated a postage meter 20 removably affixed to a base 21, in accordance with one embodiment of the invention. In this arrangement, a slot 22 is provided between the postage meter 20 and the base 21 at the forward edge thereof, for receiving envelopes or the like and the printing of postage thereon. The postage meter is provided with a display panel 23, preferably an electronic display device, as well as a control panel 24 which may be organized in a manner to be disclosed in the following paragraphs. The apparatus may be energized by way of a supply cable 25.

The postage meter 20 illustrated in FIG. 1 may be of the type that is removable from the base 21, and the base 21 may be of the type disclosed, for example, in U.S. Pat. No. 2,934,009, Bach, et al, incorporating a mechanical drive for operation of the printing mechanism in the meter 20. The separability of the meter and base renders the electronic meter compatible with conventional driving units, simplifies servicing of the device and, if necessary, simplifies transport of the meter for recharging if remote charging capabilities are not employed.

Figure 2:
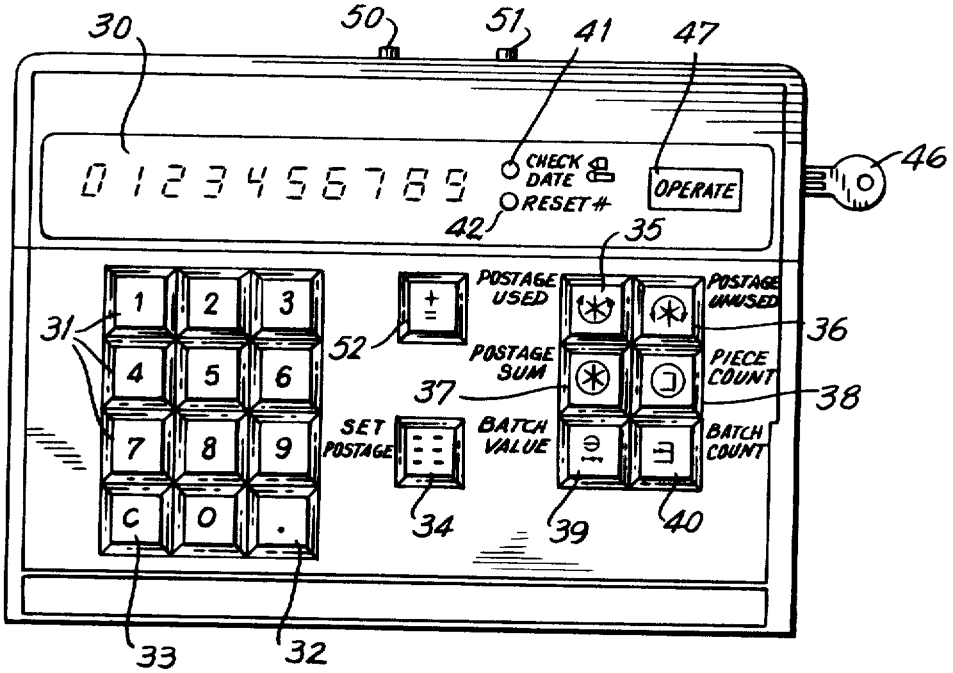
FIG. 2 is an enlarged view of the panel of the postal meter of FIG. 1.

The panel for the postage meter is more clearly illustrated in FIG. 2, wherein it is seen that the meter is provided with a numeric display 30, for example, a conventional multiplexed seven-segment LED or LCD display. In addition, the keyboard is provided with numeric setting keys 31 and a decimal key 32 operative therewith, for setting the meter to print a desired amount of postage, the amount normally being displayed on the display 30. A clear key 33 may also be provided to clear the display amount in the event, for example, of an erroneous entry. When the displayed amount has been set to the desired value, depression of a set postage key 34 effects setting of the print wheels for setting postage.

The panel may further be provided with a series of keys enabling the selective display of other values on the display 30. For example, depression of a key 35 may enable the display of the contents of an ascending register, i.e., the postage used by the meter, and depression of a key 36 may enable display of the contents of a descending register in the meter, i.e., the postage for which the meter is still charged. Further keys 37–40 may enable display in conventional manner of other specific specialized values as control or postage sum, piece count, batch value, and batch count, respectively. The batch value and batch count registers can be cleared by simultaneous depression of either batch value key or batch count key and the clear key C. The panel additionally preferably is provided with an LED 41 which will be lit upon each application of power to the meter, as is conventionally done at the beginning of a day, to indicate that the dater has not been set or that the dater door is open. A further LED display 42 may be provided and interconnected to be lit if necessary to reset the trip mechanism in the base before operation is to continue.

In order to provide recharging of the meter, for example, by way of the keyboard, the meter may be provided with a key slot 45 illustrated in FIG. 1, in which the key 46 of FIG. 2 may be inserted. The shaft of the lock may be visible through a window 47 to display the position of the key. Thus, in the normal setting of the key this shaft may display the message "operate" as illustrated. This arrangement may also be employed for remote meter resetting, as discussed, for example, in U.S. Pat. No. 4,097,923.

As a further feature, the meter may be provided with a service switch 50 at the rear thereof for the convenience of field service personnel enabling use of the keys of the meter for different functions. Upon operation of the switch 50, the keys 35 through 40 may thereby enable the display of additional values such as the unlock value, the low postage warning amount, the meter number, diagnostic status, and the maximum settable amount. Turning the switch to an "enter combination" position, as indicated in the window 47, while entering a correct coded combination in the keyboard, enables the recharging mode of the meter to he effective. In the charging mode, which may be attained by means of an internal switch lock controlled by the key 46, an "enter amount" position as shown by this message at the window 47, may enable entry of recharging value registers of the meter by way of the keyboard. Returning the key to the operate position enables the resumption of the use of the meter for printing postage.

The service switch may be in an unsecured position in the meter, since the display of the additional values rendered possible by the use of this switch does not affect the security of the meter, and merely enables the display of further values. The fact that it is these values that are being displayed may be shown by distinctive underlining of the display, if desired, and the operation of the service switch 50 partially disables the set postage key 34. It will then not be possible to set a new value of postage in the postage meter when it is in the "service" mode and the interposer will act to block operation of the meter in the service mode. However, the set key may still be used to cause the display of the currently set value.

When the meter is in the service mode, i.e., with the switch 50 operated, and the switch 45 and key 46 activated, the entry into the keyboard of a new value and a code indicating the function of that value, will enable the resetting of the unlock value, low warning postage amount or maximum settable amount, respectively. The "unlock" value is a determined value, for example, one dollar, including and above which the operator should be careful in setting so as to avoid accidental printing of excessive amounts. For this purpose, all values including and above the unlock value require an additional step on the part of the operator, such as an additional depression of the set postage key 34. The display may be provided with a distinctive indication, for example, one horizontal bar, to indicate that the printing wheels have been set but the unlock step, i.e., the additional depression of the set postage key, has not been effected. The completion of the unlock step would be indicated by the display, for example, of three horizontal bars to indicate that the meter is enabled to be tripped, to print postage.

If the descending register does not contain sufficient funds to cover the set amount on the print wheels, the entire display may be caused to blink. On the other hand, if the value stored in the descending register is lower than the low postage warning limit, the decimal point may be caused to blink. The "maximum settable" amount, of course, cannot be exceeded in the setting of any postage.

The meter may also be provided with a "privileged" switch 51 that is normally held in the operate position by a seal. The operation of this switch, following the cutting of the seal, enables the recharging of the meter by post office personnel in a nonremote charging mode.

In addition, the meter is provided with one or more arithmetic function keys 52, enabling a variation of the postage setting amount, such as the addition of further values to the already displayed setting value prior to the depression of the set switch 34. This feature enables the introduction by the operator of further values, such as insurance or the like, without the necessity for manual calculation or calculation on a separate device.

Figure 3:
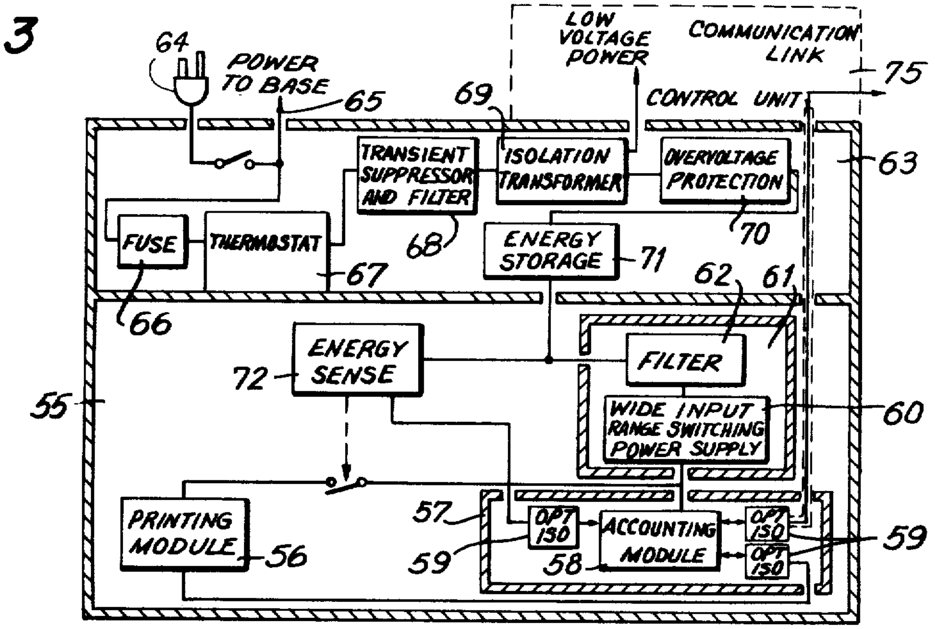
FIG. 3 is a simplified block diagram of the orientation of the elements in accordance with a preferred embodiment of the invention.

The internal components of the postage meter in accordance with the invention are preferably oriented as illustrated in FIG. 3, and include a first compartment 55 that is physically secure, i.e., as secure as is reasonably possible to avoid tampering with internal components thereof. While it may not be possible to provide 100% security in this regard, physical evidence of tampering will be evident in any event before entry can be gained. The compartment 55 encloses the printing module 56, which may include a mechanical printing assembly, and if desired, a separate microcomputer for controlling this module.

The compartment 55 also encloses a further compartment 57, which is preferably electromagnetically shielded, and encloses an accounting module 58. The accounting module is connected to external devices, i.e., external of the compartment 57, only by optical or similar isolation couplers 59 as disclosed in U.S. patent application Ser. No. 918,785 filed June 26, 1978, in order to avoid damage thereto, either accidental or intentional, resulting from introduction of noise, for example, excess voltages into the accounting module. Such coupling is, of course, not provided for the energy source thereof, which extends to a power supply 60 in a separate compartment 61 also within the secure compartment 55. The power supply 60 is energized by way of a filter 62 within the compartment 61, to insure the absence of any voltage variations that would adversely affect the accounting module, the power input to the compartment 61 being directed into the compartment 55 from a power supply system in a further compartment 63 that is preferably defined by the outer secure housing of the compartment 55. Thus, while it is not absolutely necessary for all the elements within the compartment 63 to be physically secure, this feature is preferred.

The power from the mains plug 64 is fed into the compartment 63, from where it may be fed by way of a suitable connection 65 to power the meter base. The power for the meter may be fused in the compartment 63, by means of a fuse 66, applied from the fuse to a thermostat 67 and thence to a transient suppressor and filter 68. The thermostat inhibits application of voltage to the unit in the event of excess temperatures. Further protection for the system is provided by means of an isolation transformer 69 and an over voltage cut-out device 70. The power for the meter is finally applied to an energy storage device 71, such as a large valued capacitor 71, the capacitor 71 having adequate energy storage to enable the self-protection features of the meter to operate, such as to transfer data to a nonvolatile memory, in the event of a power failure. The reduction of voltage may be sensed by a sensor 72 in the secure housing 55, with one output of the sensor being directed to the accounting module for signaling the necessity of a mode change, and another output (which can be mechanical) for inhibiting further printing module functions.

A further output of the isolation transformer 69 may be fed externally of the meter to a control unit 75, and one of the isolated outputs of the accounting module may be directed through the chamber 63 also to the control unit. The control unit 75 may thus constitute a keyboard control unit such as illustrated in FIG. 2, including the key switches, displays, etc., necessary for local operation of the device. It is thus apparent that the system of FIG. 3 orients the elements of the postal meter so that elements which are less critical to the security of the postal meter system are provided with successively lower levels of physical and electrical security.

Figure 4:
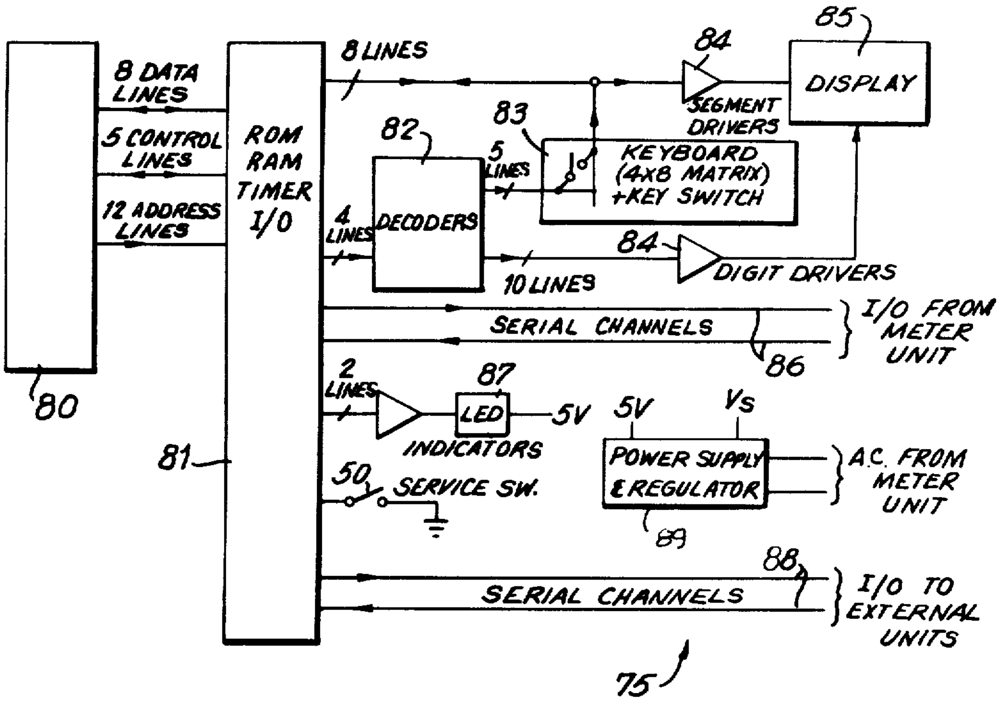
FIG. 4 is a simplified diagram of the circuitry of a control unit for a postal meter in accordance with the invention.

A preferred embodiment of a control unit 75 is illustrated in FIG. 4. This unit, for versatility in design, as well as for minimizing the noncritical elements that must be isolated in the physically secure housing, preferably incorporates a central processing unit 80, for example, of the 6500 series, and connected by way of conventional data lines, control lines and address lines to a multipurpose conventional RAM/ROM I/O timer circuit 81 incorporating read-only memories, random access memories, timing control elements and input/output interface hardware. By the use of suitable decoders 82, the keyboard 83 may thereby be scanned in the conventional fashion, and by the use of suitable drivers 84 the visual display 85 may be energized, preferably in a multiplexing mode according to conventional practice. The data relating to the depression of any of the keys of the panel may thereby be communicated to the processing unit 80, for the development of a serial input/output on the lines 86 for communication with the accounting module 58 within the secure housing 55. The processor 80 and circuit 81 are responsive to the requirement for operator interventions to recock the trigger mechanism in the base, and the failure to open or close the dater door 28 (FIG. 1) following application of power to the unit, to energize selectively an indicator LED 87 corresponding to the indicators 42 and 41, respectively, of FIG. 2. The service switch 50 may also be connected to the circuit 81. If further input/output devices are coupled to the control unit, such as external display devices or control systems, these may be coupled to the unit by way of further input/output lines 88, preferably serial communication paths which may be suitably isolated by opto isolators. The unit may comprise an internal power supply and regulator 89 connected to receive power from the postage meter low voltage power as shown in FIG. 3.

The above-discussed functions under the control of the control unit are thus functions which are not critical in the sense that loss of control or the contents of any register therein will not result in loss to the post office department, or to the user, of funds. These functions have been relegated to the control unit in order that the secure portions of the postal meter include only that programming of the system which must be secure. Additional functions that may be effected by the control unit, such as the addition of sequentially entered amounts may also be controlled by the program of the control unit, since such calculations are not critical to the security of the apparatus, and need not be effected within the physically secure portions of the postal meter. Similarly, the service resettable functions may be effected by the programming in the control unit, since these functions also are not critical to the accounting system and registers themselves. However, to retain these parameters in nonvolatile memory, retention in the accounting unit is desirable.

It will, of course, be apparent that, in a system such as shown in FIG. 4, further arithmetic keys may be provided, without great difficulty, such that the postage meter may be alternately employed also as a calculator.

Alternatively, the central processing unit and its control circuit may be augmented by a calculator chip or the like, connected to the keyboard and display for performing arithmetic functions.

While the control unit of FIG. 4, including all of the functions of the panel shown in FIG. 2 is preferably disposed directly on the postage meter to form a part thereof, it will be apparent that this portion of this system may be physically separate therefrom, or separable therefrom, whereby the postage meter itself may incorporate only the elements that are required to be physically secure.

Since monetary information and control is prevalent in the serial communication employed in the system, a high degree of integrity is mandatory. For this purpose, the system is designed, in the serial transmission communication sections, such that a transmitted bit is returned or "echoed" by the receiver thereof for checking purposes. If the transmitter thereby receives all of the echoed signals satisfactorily, it may issue a "no error" pulse, thereby informing the receiver of the information that the received information is valid.

The circuit arrangement of the accounting compartment is shown in somewhat greater detail in FIG. 5, wherein the walls 90 of the compartment are illustrated as preferably forming an electromagnetic shield. The circuits include an accounting microcomputer 91 having a nonvolatile memory control 92 coupled thereto. The nonvolatile memory control controls the application of stored data between a volatile memory, which may form a part of the accounting microcomputer 91 and a nonvolatile memory 93. The volatile memories, such as random access memories, may function as working ascending registers, working descending registers, and the like. The accounting microcomputer also includes read-only memory control for the necessary accounting routines, as well as control routines. This unit may, in addition, incorporate serial interfaces, to enable its interfacing with the printing and control modules. The microcomputer may, for example, comprise the 8048 series microcomputer from Intel Corporation, Santa Clara, Calif., with a control circuit in a manner similar to that described above with respect to the control unit 75. In order to avoid damage to the accounting module by electric surges applied accidentally or intentionally, and to eliminate electrical noise induced via groundloops, the accounting microcomputer communicates with the devices external of the compartment 57 by suitable isolators that are not capable of applying voltage surges to the microcomputer. These isolators may, for example, be in the form of opto-electronic couplers, and are also preferably arranged so as to be inaccessible from the exterior of the postal meter. One isolator unit 94 may be provided for the two-way communication path with the control unit. A further isolator arrangement 95 may be provided for the two-way communication with the printer unit, i.e., the printing module 56 of FIG. 3, in particular, the microprocessor circuit thereof. A still further isolator 96 may be provided for applying the power sensing signals to the microcomputer 91. In addition, an isolator 97 may be provided for controlling an interposer (not shown) in the printing module, for example, for mechanically blocking functions of the printer. Such a system is disclosed, for example, in U.S. patent application Ser. No. 024,812 filed Mar. 28, 1979 by R. McFiggans and A. Eckert, and assigned to the assignee of the present invention, the disclosure of which is specifically incorporated herein by reference.

The nonvolatile memory 93, at the present state of the art, is preferably in the form of an MNOS memory, which does not require a back-up power source. This memory may, however, alternatively be formed of elements which do require a power back-up, in which case a power control circuit may be employed to apply back-up power thereto. The purpose of the power control circuit 98 is to provide power to the MNOS memory for the purpose of effecting its data transfer operation, essentially during power up and power down. The program of the microcomputing unit 91 is organized to enter the contents of the registers of the computer units into the nonvolatile memory as soon as any indication of failure of the power supply occurs, and to restore this data to the working registers upon restoration of the power.

The thermostat 67 in FIG. 3 cuts off power to the meter in the event of high or low temperature operation. This automatically places the meter in its power down cycle, as a result of the power cut-off.

The compartment 57 may further comprise a temperature sensor 99, with suitable circuits (not shown) coupled thereto, such as to the microcomputer, for transferring data to the nonvolatile memory in the event of excess temperatures. The system may further be operative to prevent the operation of the interposer solenoid by way of the isolator 97, in the event of excess temperature. It will be appreciated that the interposer is controlled by the microcomputer 91 also to inhibit operation of the printer in the event that insufficient postage remains for a printing operation, or other accounting data indicates that the unit should not be operative.

While the isolators have been indicated as individual units, it is, of course, apparent that these units may incorporate multiple devices, so that two-way communication is established in the respective circuits. It is further noted that systems for the transfer of data between volatile and nonvolatile memories are well known, and are disclosed, for example, in copending application Ser. No. 889,627 filed Mar. 24, 1978 and now U.S. Pat. No. 4,224,506 issued Sept. 23, 1980.

Figure 6:
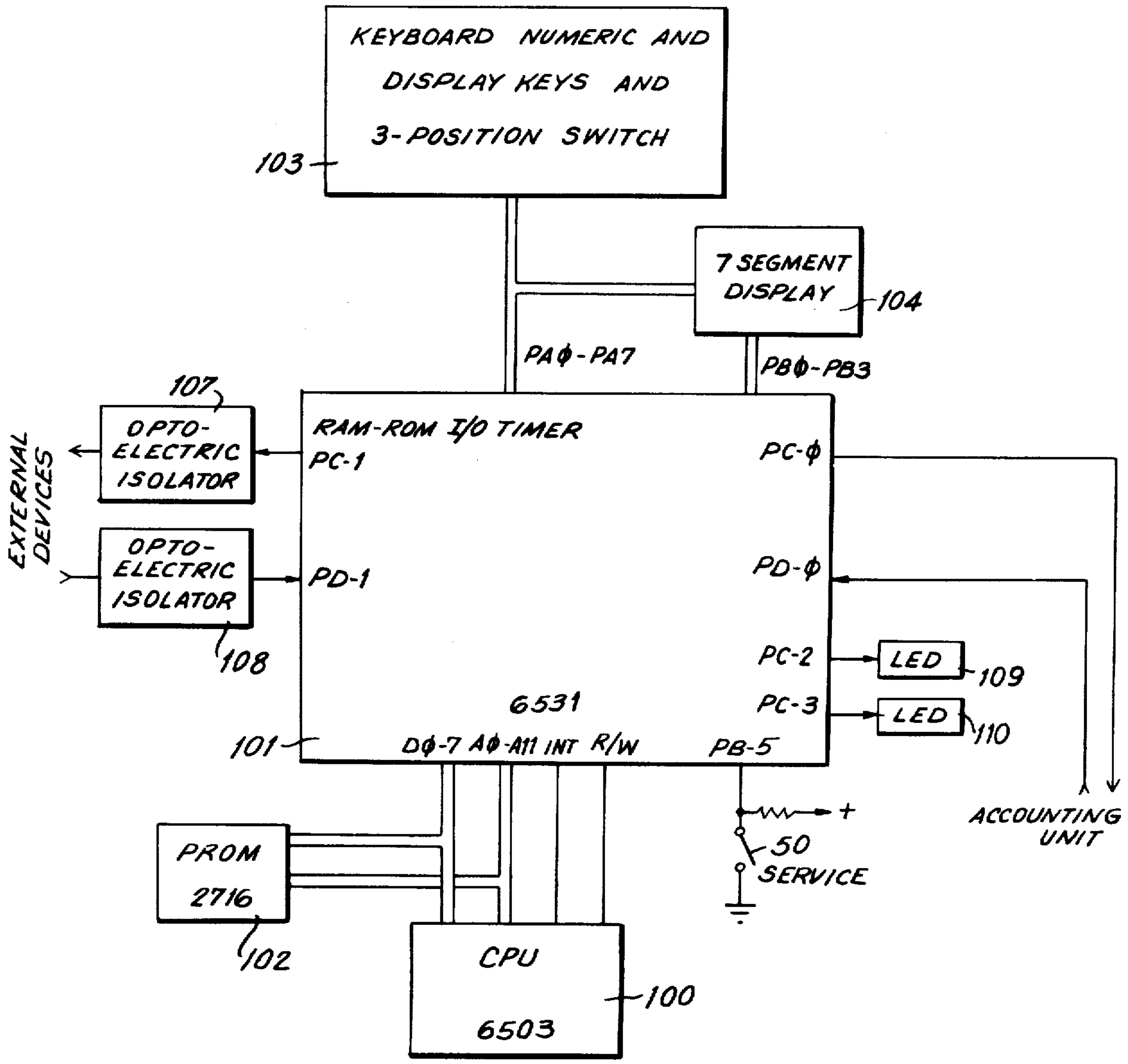
FIG. 6 is a more detailed block diagram of a preferred embodiment of the control unit for a postal meter in accordance with the invention.

Referring now to FIG. 6, therein as illustrated in greater detail a block diagram of a preferred embodiment of a control unit in accordance with the invention. In this figure the blocks have been identified by part numbers and terminals where applicable. This unit is illustrated as incorporating a type 6503 CPU 100 having its data and address lines coupled to RAM/ROM I/O timer circuit 101 as well as to a type 2716 PROM 102, the PROM 102 having stored therein the program for the control unit. Control lines, such as the interrupt line and read/write line may also be connected to the circuit 101. The circuit 101 has a plurality of ports, as will be discussed.

The control unit further incorporates the keyboard 103 including the numeric keys 31, the display keys 35–40, and the three-position switch 45 shown in FIG. 1. This unit also includes the add-through key 52 and the set postage key 34. All of these keys and switches are connected in a matrix to the circuit 101, in conventional manner, to permit the scanning of the keys and switches in accordance with the program, to detect a key or switch closure. The eight-line port A, as well as four lines of port B of the circuit 101, are also connected to the seven-segment display panel 104 for multiplexed display in the conventional manner. The circuit 101 is further connected by a pair of serial ports for communication to and from the accounting unit. In addition, a pair of further serial ports enable communication to and from external devices, by way of opto-electric isolators 107 and 108, respectively. Another output port of the adaptor is connected to LED 109 for indicating on the display panel that the dater door has not been closed. A further output port is connected to an LED 110 on the display panel for indicating that the operator's intervention is required to recock the trigger mechanism on the base. Finally, another port is coupled to the service switch 50, to enable the functions of the postal meter in the service mode.

In the preferred embodiment of the invention, the program of the control unit is directed to servicing of the keyboard unit, display panel, etc., so that the control functions and storage of data are effected primarily in the accounting unit. The program thereby includes those functions necessary for the scanning of the keyboard, multiplexing of the display, formatting of signals for communication with the other units, and with external devices, etc., so that any new information may be passed on to the accounting unit.

A typical opto-electric isolator is shown in FIG. 7, this constituting primariliy a conventional 6N136 device 115 including a solid state emitter for producing optical signals for reception by a photodiode, the photodiode being connected in the base circuit of a transistor amplifier.

Figure 8:
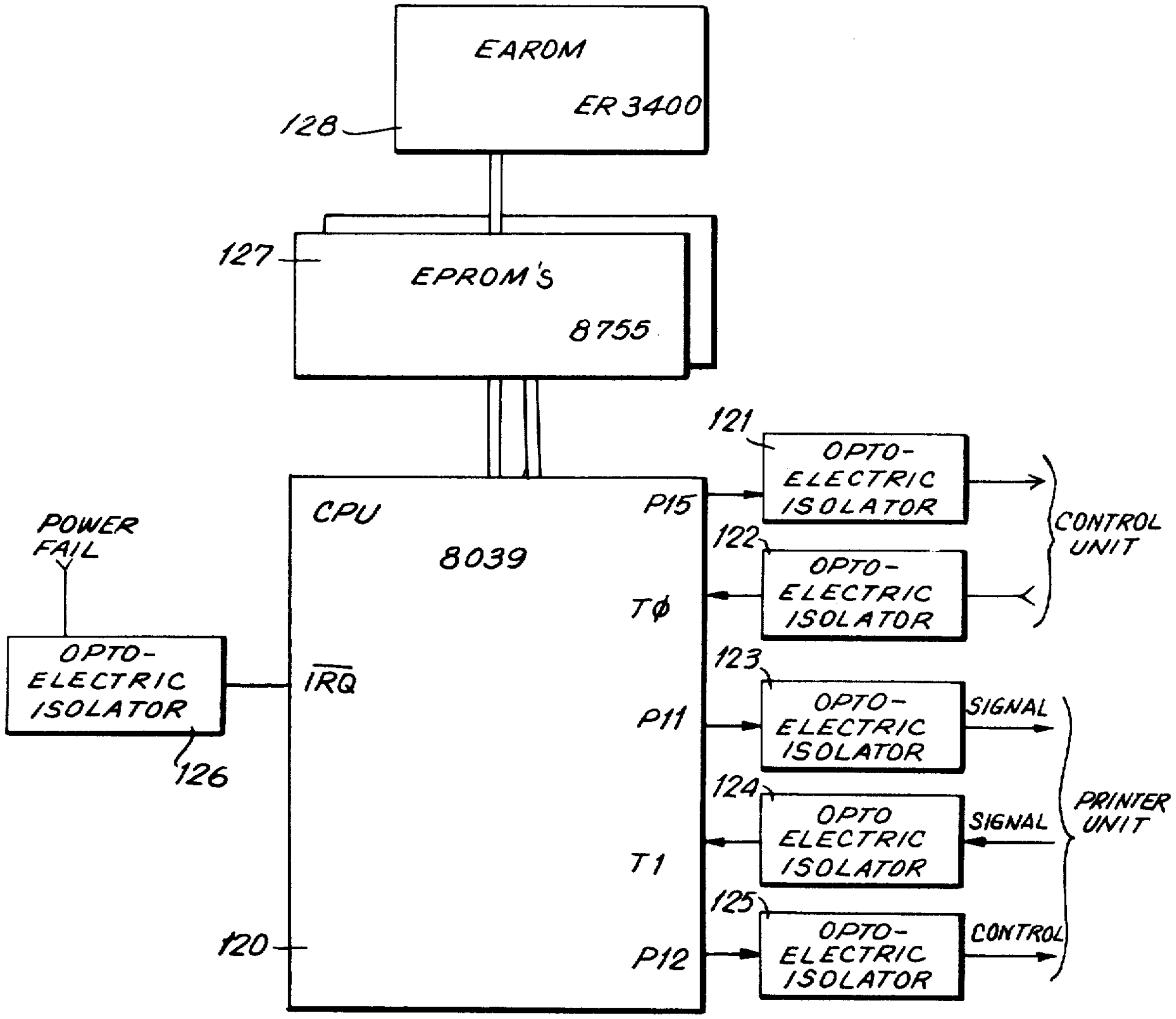
FIG. 8 is a more detailed block diagram of a preferred embodiment of an accounting unit in accordance with the invention.

A block diagram of a preferred example of the accounting unit is illustrated in FIG. 8, a wherein a type 8039 CPU 120 is shown to communicate to the control unit by way of opto-electric isolators 121 and 122, and to communicate serially with the printer unit by way of opto-electric isolators 123 and 124. The opto-electric isolators 121 and 122 within the accounting unit thus may be connected directly to the corresponding leads of the control unit. The isolators 123 and 124 may be connected directly to the printer unit signal channels, since no further isolation devices are necessary for this purpose. In addition, a control opto-electric isolator 125, for controlling an interposer or the like in the printing unit may be connected to a further port of the CPU 120. Signals corresponding to a pending power failure are further fed to the interrupt port of the CPU 120, by way of opto-electric isolator 126. It is thus apparent that all signal and control to and from the accounting unit must be directed by way of opto-electric isolators, in order to insure the electrical and physical integrity of this unit. The accounting unit further includes a plurality of PROMs 127 coupled to the address and data lines of the CPU 120, each PROM 127 for example, being a E-PROM type 8755. This unit is connected to an electrically alterable read-only memory (EAROM) 128, for example, a type ER 3400, serving as a nonvolatile memory to store data at times during which the power supply to the postage meter has failed, or has been intentionally disconnected. The working memory for the accounting system, including the registers for storing all operational data, are provided in the CPU 120, this data transferred to the electrically alterable ROM 128 at such time that a reduction of power is sensed. In order to insure the complete transfer of data, storage capacitors may be connected in conventional manner to store adequate power to insure the proper functioning of the circuit until the transfer of data has been effected.

Figure 9:
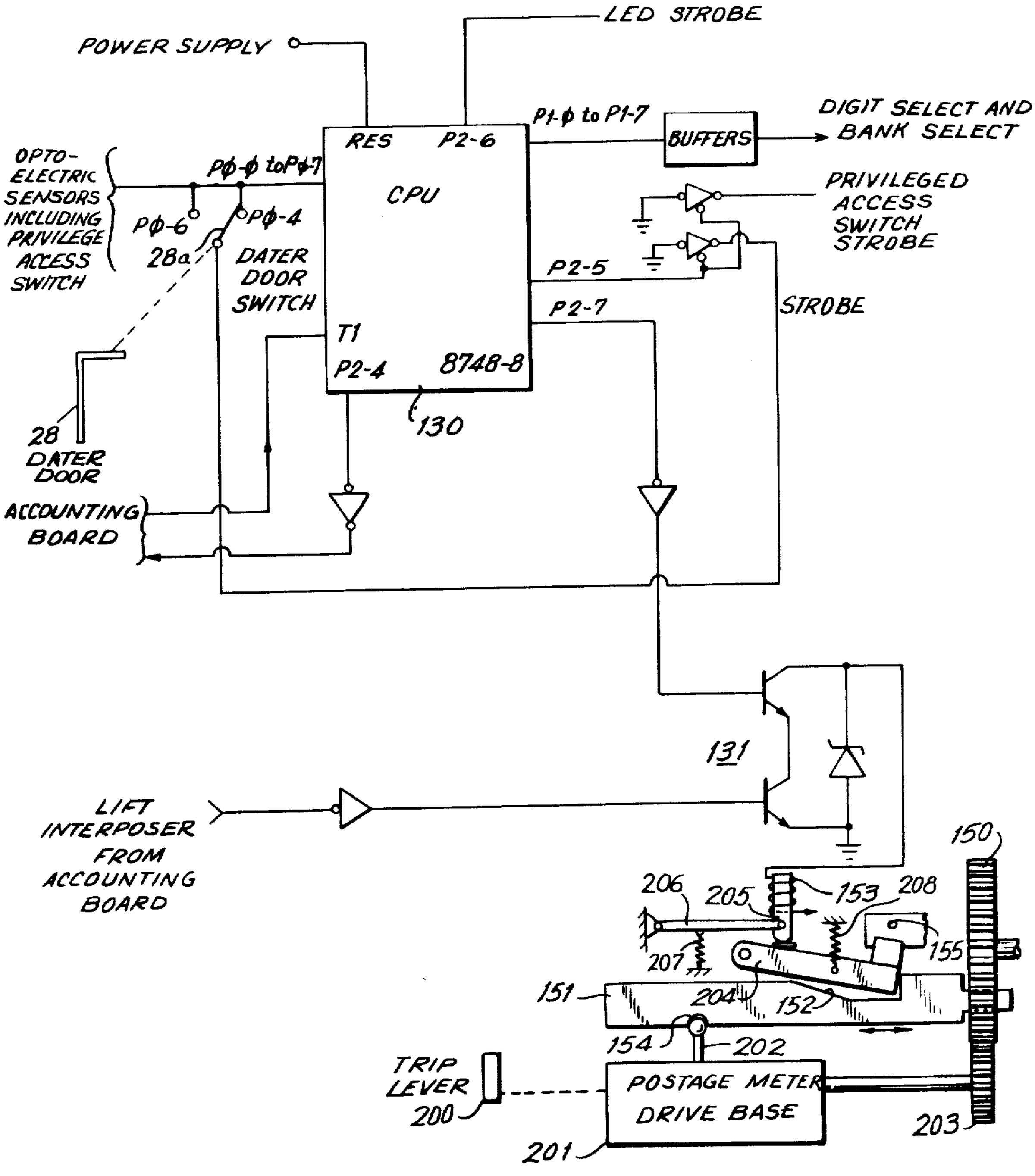
FIG. 9 is a block diagram of a preferred embodiment of the electrical system of the printing unit of a postal meter in accordance with the invention.

A preferred example of the circuit of the printing unit is illustrated in FIG. 9, this circuit consisting primarily of the CPU 130, for example, a type 8748-8, the CPU being connected by way of suitable buffers where necessary, to the I/O devices within the printing unit itself. The mechanical and opto-electric sensing systems in the printing unit are conventional and may be generally of the type disclosed, for example, in U.S. Pat. No. 4,050,374 and aforementioned copending application Ser. No. 024,812, the disclosures of which are specifically incorporated herein by reference. Thus, the CPU is connected to a plurality of opto-electric sensors (not shown) for sensing of the positioning of the print wheels, these lines also being connected to enable the sensing of the privileged access switch 51 of FIG. 2, The privileged access switch 51 is located within the printing unit and is accessible only by way of a door sealed by the post office. These lines of the CPU are further connected to sense the position of the dater door, the dater door switch and privileged access switch being strobed by way of a further output of the CPU 130. The LEDs for the optical sensors are strobed at the proper times by way of another output of the CPU 130, and still further outputs of the CPU enable the stepping of the bank and digit stepping motors for the print wheels. In addition, the CPU 130 has a pair of ports for serially communicating to and from the accounting unit. Further, the interposer output from the accounting unit, and another output of the CPU 130 control a pair of transistors 131 for energizing the interposer solenoid, whereby the interposer solenoid 153 is not energized until all the preconditions are met both in the accounting unit and the printing unit. As a result, a printing cycle cannot commence unless the physical and electrical conditions in the meter are correct for normal printing. In the printing unit, it is therefore evident that the program is provided within the CPU itself.

Postal meters of the above-described form may be provided with several modifications. For example, in one modification, a remote charging feature is available whereby the key is provided for operation of the three-position charging switch on the keyboard. The operator of the unit may thus be provided with suitable combination for entry into the keyboard, to enable remote charging (i.e., away from the post office). In such units the privileged access switch is omitted.

In a further modification, the three-position recharging switch on the keyboard may be controlled by a simple knob, without the necessity of a key. In this type of a system, the meter may be manually recharged at the post office, but the service functions may be effected locally in a manner similar to that of RMRS type units.

In other words, recharging of a postal meter of the above type can be effected locally, if devices are provided with a key for the three-position switch, in which event further security is required as will be discussed later. On the other hand, in postal meters having a simple knob switch instead of the key switch, the "privileged access", sealed at the post office, is provided for manual recharging.

In the normal mode of operation of the system, as above discussed, the six display keys, when depressed, effect the display on the display panel of the six parameters above noted, i.e., the total in the ascending register of all postage that has been printed, the total remaining in the descending register of postage available, the control sum, the total number of printing operations of the meter, the value of postage printed and the number of pieces that have been printed since the last batch clear operation of the associated registers. The depression of these keys results only in the number of concern being displayed for a timed period after the key is released, for example, two seconds following which the display will return to the postage setting.

In either type of meter, if the service switch is placed in the service position, with the three-position switch still in the operate position, the display function of the display keys will be different. Thus, the depression of the "postage used" key 35 will now result in a display of the current value set in the dollar unlock register in the machine, at or above which an operator cannot print postage. Postage values above this value require an additional depression of the set postage key for operation, in order to avoid accidental printing of excessive postage values. Depression of the "postage unused" key 36 will now result in a display of the value in the low postage warning register at which a warning should be given that the contents of the descending register are below a determined amount. Depression of the control or "postage sum" key 37, will now result in the display of the serial number of the postal meter. Depression of the "piece count" key 38 will now result in a display of the diagnostic status of the meter. This display provides an indication of the serviceman of possible misfunctions. A depression of the "batch value" key 39 will now result in a display of the maximum settable amount, i.e., the maximum amount set internally within the meter, above which the meter cannot set the print registers. Depression of the "batch count " key 40 will have no effect in the service mode.

The three-position switch is used to effect recharging of the meter or to effect the change of values in the registers concerned with dollar unlock value, the low postage warning amount and the maximum settable amount.

With the remote recharging system feature, positioning the three-position switch in either the "enter combination" or "enter amount" positions enables the customer to enter combination or amount respectively into the meter via the keyboard with indication on the display. Leaving the position enters the display value into the accounting unit and blanks the display for the next entry. Return of the three-position switch to the operate position will cause the accounting unit to complete the recharging routine and return the meter to normal usage with the recharging amount added to the postage unused register. The combination for the remote recharging system feature is obtained from a remote recharging system data center and is a random or pseudorandom number which changes with each recharging for security reasons.

For meters with the manual recharging system feature, the recharging mode is effected by breaking the seal of the privileged access door, and flipping of the privileged access switch. The same sequence of operations of the three-position switch described above for recharging the meter are followed as in those meters having the remote recharging system feature. In the manual recharging system machine only post office personnel are permitted to effect the change. The combination is a fixed number known only to the post office and is stored within the meter. Normal operation of the meter may proceed once the privileged access switch has been returned to its operate position.

To change values in the registers concerned with dollar unlock value, the low postage warning amount and the maximum settable amount the serviceman would place the meter in the service mode by placing the service switch in the service position. The three-position switch is used as described above for the entry of combination and amount values. The meter will interpret the combination value to indicate which register is to be changed.

For the remote recharging system meter and the manual recharging system meter if an error has been made in entry, the occurrence of this error will be counted, as constituting evidence of tampering with the machine. When a determined number of such errors have been made, for example, 9, since the last setting of the meter, then the function of the machine in recharging postage will be inhibited. The return of the meter to operating status in such circumstances may be effected at the post office. A discussion of the means to return the meter to operating status is not of consequence to the present invention and relates to the security of the meter.

As above discussed, each of the three units of the postal meter has a microprocessor with a read-only memory defining a given program, and the communication between the units is effected serially and asynchronously. This is achieved in the first place by providing each of the computer systems with a crystal controlled clock. Further, the signals are defined such that the transitions thereof are closely controlled, whereby it is insured that, if a signal is present, it must be present within a given time period. As a still further insurance of the correctness of communication, the bits of a signal are returned to a transmitter as soon as they are received, for error checking at the transmitter, whereby a "no error" bit may be transmitted immediately following a data message if the data has followed correctly.

The program of the control unit responds to the status of the postal meter with respect to determined parameters. A register in the microprocessor of the accounting unit holds meter status information, for example, of two bytes, the bits of which digitally indicate if the meter trip mechanism requires recocking, if the dater door has not been opened following the last application of power or is presently open, if there are insufficient funds to allow printing of the amount set in the print wheels, if the low postage value has been reached, if the meter is in a service mode, if the meter is enabled, if the batch registers are clear, if a trip has been completed, or if various types of errors have occurred. The status message associated with these bits is not the same as the diagnostic message noted above that is employed in the service mode. The accounting unit keeps the control unit informed of the current status by transmitting status message to the control unit after power has been turned on and, thereafter, whenever a change in status occurs, the conrol unit responds to all such messages by insuring that the display on the meter is consistent with the status message as above discussed. These later steps may include, for example, the display of a row of decimals in the event of certain errors, the flashing of the decimal point in the event of low postage funds, the flashing of the entire display in the event of insufficient postage, the displaying of underscores in the place of blanks if the meter is in the service mode.

An interrupt program in the control unit interrupts the main program of the control unit at regular intervals in order to scan the keyboard and keyswitch, and to drive the display. In order to prevent the display of spurious characters which can be produced by sneak currents when more than one key is pressed, the interrupt program will cause the display to go blank instead. Such values as relate to time, keyboard, and keyswitch are maintained by the interrupt program for use by the main controller program.

The main program for the control unit includes the initializing steps, program steps for the transfer of messages back and forth between the accounting unit and external devices, and control of the timed display, the checking of the status message to insure that dater door and reset base lights are lit in accordance with the status, responding to the reported positions of keys, and three-position switch to ascertain changes of state therein so that the control unit subroutine which corresponds to the function defined for such a state or change of state will be executed.

The program of the accounting unit includes initialization procedures to insure that the working registers are brought up to date, and that no postage has been printed that has not been accounted for, as well as a power down processing program to effect the transfer of data to the nonvolatile (electrically alterable) memory in the event that the power is shut down or is failing.

The main program of the accounting unit effects the transmission of the meter status message to the control unit upon request or change in status, determines the effect of any currently entered postage value on the funding data currently registered and makes any necessary variations in the status message. The main program also controls the timing in the accounting unit for receiving messages from the control unit and the printer. The accounting unit program further includes subroutines for processing of signals in the bringing of the registers up to date when postage is to be printed, and for controlling the operation of the system when the meter is tripped. A further subroutine controls the bringing of the meter status message up to date. In addition an error checking routine which involves cyclical redundancy checking is programmed in the accounting unit software. This will be described in further detail below.

The program of the printer unit includes a main program having initializing steps, steps for scanning the sensors and controlling the strobes for the LEDs of the sensors, and the processing of messages for communication with the accounting system. Subroutines are provided for the setting of the postage wheels, to determine if sensor readings are proper, and to determine if any changes have been made in the outputs of the various hardware sensors and switches such as the privileged access and the dater door switch.

Referring again to FIG. 9, the driving gear 150 of the postal meter, which is mechanically coupled to the printing drum, is positioned in conventional manner to be driven by the output gear 203 of the drive base 201 in a conventional manner. The drive base has a shutter lever 202 engaging a notch 154 in the shutter 151 of the postal meter, the shutter 151 being movable into and out of locking engagement with the driving gear 150. The shutter 151 is provided with a further notch 152 positioned to receive a pivoted lever or interposer 204 in the lock position of the postal meter, i.e., when the shutter blocks movement of the gear 150. A lever 206 having a fixed pivot at one end, if pivoted at its other end to the core 205 of a solenoid 153, the free end of the solenoid engaging the interposer 204. A spring 207 affixed to the lever 206 urges the core 205 against the interposer in such a direction as to urge the interposer into the notch 152 when the solenoid is de-energized and the notch is aligned therewith. This portion of the system is further provided with a light sensor device 155 positioned to provide a signal to the circuit 130 indicating whether or not the interposer is in interlocking position in the notch 152 of the shutter. The solenoid core is not mechanically held to the interposer, so that, upon energization, the core of the solenoid will not itself effect the withdrawal of the interposer from the notch. A light spring 208 is therefore connected to the interposer, with a sense to pull it from the notch unless the shutter is jammed against the interposer. The spring 208, of course, does not have adequate strength to withdraw the interposer from the notch against the opposite directed force of the spring 207 when the solenoid is de-energized. The reference numeral 200 depicts the trip lever of the drive. The sensor 155, which may be an LED sensor, may be strobed by the output of the circuit 130 in turn as are the other optical sensing devices in the printing unit. It is thus apparent that, upon conduction of the transistors 131, the solenoid 153 is energized to cause the interposer to be released from the shutter, thereby enabling withdrawal of the shutter from the driving gear 150 under the control of the shutter lever 202 of the drive base, in the conventional manner. Although a notch 152, utilized as a retaining means, is shown, it will be understood that a laterally extending tab may also be employed. Further, the pivot on lever 206 is not essential in that a linear movement can be imparted to the lever 206 to catch the shutter 151. Other variations may also be employed. Systems of this type are disclosed, for example, in copending application Ser. No. 024,812 filed Mar. 28, 1979, and assigned to the assignee of the present application, and also in copending application Ser. No. (89,412) filed concurrently herewith, for a "Print Control System", by A. Eckert, R. Malin, R. McFiggans and L. Pengue, and assigned to the assignee of the present invention.

In the operation of this portion of the system of the invention, it is noted that the two transistors 131 act effectively as an AND gate, whereby, in order to release the driving gear, one of the transistors must be rendered conductive by an output of the circuit 130 in the printing unit, and the other of the transistors must be rendered conductive by the direct control of the circuit 120 of the accounting unit by way of the opto-electric isolator 125. As described above, the transistors each respond to separate input systems, in the respective separate microprocessors, which have coordinated activity as a result of an exchange of messages regarding the status of the different portions of the meter.

As a consequence, when a fault or other condition occurs that renders it undesireable for the meter to print postage, and this condition is determined in one of the controlling systems, this controlling system renders or maintains its associated transistor non-conductive, and signals the other controlling system to likewise render or maintain its transistor non-conductive. It is thus apparent that faults in either of the transistors as well as certain faults in the controlling systems will not result in the erroneous printing of postage.

A disable condition may originate in either the accounting or printer unit. Some typical conditions for an accounting unit initiated disable are signals from the control unit, i.e., set postage or service switch activations; signals from external devices, i.e., disable command; internal conditions, i.e., lack of sufficient unused postage; errors, i.e., CRC check failures, communication errors or time out. An accounting unit initiated disable removes the drive signal to the lower transistor in AND gate 131. The release of solenoid 153 unblocks photocell 155 which is sensed by the printer CPU 130. This initiates a change of status message to the accounting unit via P2-4.

A failure of the printing unit to respond with the correct status bit within several milliseconds (for example 60) is spotted as a failure condition by the accounting unit. It then starts a static message to the printer unit. The failure of this message to meet the normal protocol expected by the printer causes a communication error condition in the printer which now removes its drive to the transistor pair 131, if it had not been done previously. The auxiliary interposer, described in copending patent application Ser. No. 89,412 filed concurrently herewith, for a "Print Control System", by A.

Eckert, R. Malin, R. McFiggans and L. Pengue, and assigned to the is also energized to redundantly prevent printing.

The printer may initiate a disable command for several reasons. Some originate in hardware or the failure of hardware such as during operation of the dater door or privileged access switch; failure of the stepping motors or sensors; trip message. The printer de-energizes the top transistor of AND gate 131 and sends a status message to the accounting unit. The accounting unit will not redundantly disable the lower transistor 131. A failure to receive a status message with the interposer bit representing an unblocked photocell 155 condition within a predetermined time period will initiate the communication error procedure described above causing the printer to engage its auxiliary interposer.

As a special condition, if the accounting unit has not sent a disable command before requesting the printer to set postage, the printer will disable its solenoid drive transistor 131 on its own.

In some cases the printer intiates a disable procedure on its own and then enables the solenoid again before it can normally move. Specifically this is done during trip and communication receiving routines. When a trip cycle commences, the printer disables the AND gate 131 and sends a trip message to the accounting unit. If the accounting unit is not busy, it can complete its accounting and respond to the printer with an accounting complete message which is used by the printer to re-energize the interposer solenoid 153 before it can physically move. If the accounting unit is busy, a delayed response will allow solenoid 153 to fall and will prevent the meter from tripping again until the accounting operation is complete.

In a similar manner, a communications time out error from the accounting unit to the printer disables the interposer solenoid as soon as possible. The printer disables this solenoid while waiting for the start edge of each incoming byte. Since these normally occur at about 1 MS intervals, at which time the solenoid is re-energized, the interposer solenoid never moves unless a communication time out occurs.

An additional procedure is used to allow one microprocessor to monitor the other for proper operation. If the accounting unit has not received a message from the printer unit within approximately 1/6 of a second it requests a status message. Failure of the printer to respond within several milliseconds sets the accounting unit initiated disables procedure into operation. An accounting unit failure is known to the printer by a failure to communicate whenever a printer operation takes place.

It will of course be apparent that the features of the present invention may be incorporated in other postage meters than the three separate unit type herein disclosed, since the invention is not dependent upon this feature for novelty.

A complete flow chart of the software functions of the accounting, control and printing units is shown in greater detail in copending application Ser. No. 89,413, filed concurrently herewith and assigned to the assignee of the present invention. In addition, a complete printout of the programs actually contained within the permanent memory of each microprocessor in each of the accounting, control and printing units, respectively is disclosed therein. That disclosure is specifically incorporated by reference in this application.

Variations and modifications in the different functions performed by the operation of the apparatus of the present invention can be effected in accordance with changes in the various programs previously set in memory.

It is known and understood that the terms postage meter and postal meter, as used herein, refer to the general definition of a device for the imprinting of a defined unit value for governmental or private carrier parcel, envelope or package delivery, or other like application for unit value printing. Thus, although the term postal meter is utilized, it is both known and employed in the trade as a general term for devices utilized in conjunction with services other than those exclusively employed by governmental postal services. For example, private parcel or freight services purchase and employ postal meters as a means to provide unit value pricing for individual parcels, including accounting and printing functions.

The present invention is particularly directed to use in a postal meter which will employ varying features and functions, described in differing aspects, in any one or more of the following groups of copending patent applications, including this one, all filed concurrently: Ser. No. 89,424 to Jones, et al, for "POSTAGE METER HAVING INTERACTIVE ARITHMETIC OPERATION CAPABILITY"; Ser. No. 89,425 to Eckert, et al, for "POSTAGE METER HAVING FIELD RESETTABLE CONTROL VALUES"; Ser. No. 89,426 to Eckert, et al, for "ELECTRONIC POSTAGE METER HAVING KEYBOARD ENTERED COMBINATION FOR RECHARGING"; Ser. No. 89,422 to Eckert, et al, for "ELECTRONIC POSTAGE METER HAVING CHECK DATE WARNING"; Ser. No. 89,427 to Eckert, et al, for "ELECTRONIC POSTAGE METER HAVING RESET BASE WARNING"; Ser. No. 89,434 to Muller for "ELECTRONIC POSTAGE METER OPERATING VOLTAGE VARIATION SENSING SYSTEM"; Ser. No. 89,412 to Eckert, et al, for "PRINT CONTROL SYSTEM"; Ser. No. 89,413 to Soderberg, et al, for "ELECTRONIC POSTAGE METER HAVING PLURAL COMPUTING SYSTEMS"; Ser. No. 89,411 to Eckert, et al, for "INTERPOSER CONTROL FOR ELECTRONIC POSTAGE METER".

While this invention has been disclosed and described with reference to a simple embodiment thereof, it will be apparent that variations and modifications may be made therein, and it is intended in the following claims to cover each such variation and modifications as falls within the true spirit and scope of the invention.

What is claimed is:

1. In an electronic postal meter having a printing device adapted to be driven by a drive base, a shutter positioned to be movable into and out of block engagement with said printing device by said drive base, interposer means for inhibiting movement of said shutter out of its blocking position, and output circuit means for controlling said interposer means, the improvement wherein said postal meter has first and second control circuit means, a pair of serially connected current controlling devices connected to control said output circuit means, said control circuit means being connected to control separate ones of said current switching devices, said control circuit means being intercoupled to exchange data relating to the operational conditions in said postal meter to provide redundant control of said semiconductor devices.

2. The postal meter of claim 1, wherein said current switching devices are bi-polar transistors having serially connected emitter-collector paths.

3. The postal meter of claim 2, wherein said output circuit means comprises a solenoid.

4. The postal meter of claim 3, wherein said printing device comprises a driving gear adapted to be driven by said drive base, said shutter having a blocking position engaging said gear and having a retaining means therein, said interposer comprising a lever positioned to engage said retaining means said solenoid being mounted to urge said interposer in said retaining means in its non-energized state.

5. The postal meter of claim 3, wherein said first and second control circuit means comprise micro-processing systems, and further comprising a serial communication path between said micro-processing systems, said micro-processing systems being programmed to continually exchange messages relating to the operational status of elements in said postal meter.

6. An electronic postal meter having means inhibiting operation of said meter, system testing means for producing signals in response to the occurrence of states of said meter under which postage should not be printed, said system testing means including first and second signal processing systems, a communication path between said processing systems, each of said processing systems having a routine for continually sending messages to the other of said processing systems, including data concerning the states of said meter, a pair of serially connected control means connected to control said inhibiting means, with said first and second processing systems being coupled to control separate ones of said control means, whereby said inhibiting means is redundantly controlled.

7. The postal meter of claim 6, wherein said inhibiting means comprises an interposer system including a solenoid, said control means being connected to energize said solenoid.

8. The postal meter of claim 7, wherein said control means each comprise a transistor, the emitter-collector paths of said transistors being connected to energize said solenoid, whereby the first and second processing systems are coupled to the bases of separate ones of said transistor.

9. The postal meter of claim 8, wherein said first processing system comprises a microprocessor circuit for controlling printing operations of said postal meter and said second signal processing system comprises a microprocessor connected to control accounting in said postal meter.

10. A control system for an output device, said control system comprising first and second data processing systems each having a routine including the transmission to the other of messages concerning the status of elements of said control system, a pair of control means serially connected to control the operation of said output device, each of said control means being connected to an output of a separate one of said processing systems, whereby said output device is redundantly controlled by said processing systems.

11. An electronic postage meter comprising:

means for printing postage, said printing means adapted to be energized by a source of operating energy to print postage;

accounting circuit means operably connected for accounting for postage printed by said printing means;

energizing means operably connected to said printing means for energizing said printing means to print postage;

postage printing inhibiting means coupled to said energizing means for inhibiting said energizing means from being operable to energize said postage printing means to print postage;

printing control circuit means operably connected for controlling said means for printing; and actuating means coupled to said postage printing inhibiting means for actuating said postage printing inhibiting means to inhibit said energizing means from being operable to energize said postage printing means to print postage, said actuating means connected to said accounting circuit means and said printing control circuit means.

12. An electronic postage meter system as defined in claim 11 including communication channel means coupled between said accounting circuit means and said printing control circuit for carrying signal information between said accounting circuit means and said printing control circuit means, and said accounting circuit means operable upon the failure to receive signal information within a predetermined time from said printing control circuit means to cause said actuating means to actuate said postage printing inhibiting means to inhibit said energizing means from being operable to energize said postage printing means to print postage.

13. An electronic postage meter as defined in claim 12 wherein said accounting circuit means is operable upon the failure to receive signal within a predetermined time from said printing control circuit means to transmit signal information requesting status message signal information from said printing control circuit means and is operable upon failure to receive said requested status message signal information within a predetermined time to cause said actuating means to actuate said postage printing inhibiting means.

14. An electronic postage meter system as defined in claim 11 including communication channel means coupled between said accounting circuit means and said printing control circuit means for carrying signal information between said accounting circuit means and said printing control circuit means.

15. An electronic postage meter system as defined in claim 14 wherein said accounting circuit means and said printing control circuit means are each operable to transmit signal information over said communication channel means.

16. An electronic postage meter as defined in claim 15 wherein said accounting circuit means and said printing control circuit means monitor the signal information transmitted by the other and are each operable upon the failure to receive properly transmitted signal information from the other to cause said actuating means to actuate said postage printing inhibiting means to inhibit said energizing means from being operable to energize said postage printing means to print postage.

17. An electronic postage meter as defined in claim 15 wherein the time for said accounting circuit means and said printing control circuit means to transmit and receive status message signal information from each other is shorter than the time after actuation for said postage printing inhibiting means to be operable to inhibit said energizing means from being operable to energize said postage printing means to print postage.

18. An electronic postage meter as defined in claim 17 wherein said printing control circuit means is operable to cause said actuating means to actuate said postage printing inhibiting means to be operable to inhibit said energizing means from being operable to energize said postage printing means to print postage when said printing control circuit means has transmitted a signal information message that a postage printing operation has commenced and fails to receive accounting complete message signal information from said accounting circuit means.

19. An electronic postage meter, comprising:

means for printing postage;

a first and a second computing means operably connected to control the functioning of said electronic postage meter;

energizing means connected to said printing means for energizing said printing means to print postage;

postage printing inhibiting means coupled to said energizing means for inhibiting said energizing means from being operable to energize said postage printing means to print postage;

said first and second computing means connected to each other such that said first computing means monitors the proper operation of said second computing means; and said first computing means connected to said postage printing inhibiting means to actuate said posting printing inhibiting means to inhibiting said energizing means from being operable to energize said postage printing means to print postage whenever said first computing means detects a failure of proper operation in said second computing means.

20. A postage meter as defined in claim 19 wherein said second computing means monitors the proper operation of said first computing means and said second computing means is connected to said postage printing inhibiting means to actuate said postage printing inhibiting means to inhibit said energizing means from being operable to energize said postage printing means to print postage whenever said second computing means detects a failure in proper operation in said first computing means.

* * * * *